Figure 1:
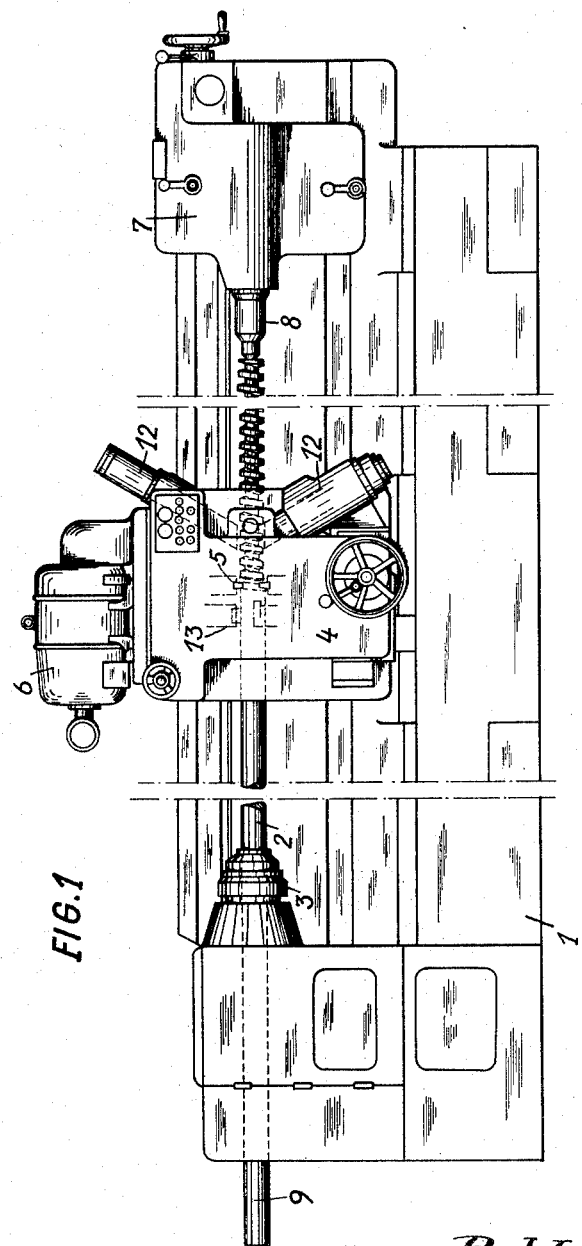

Dec. 25, 1956  R. WAGNER ET AL  2,775,167
MACHINING OF LONG WORK-PIECES
Filed March 9, 1953  2 Sheets-Sheet 1

INVENTORS
R. Wagner
J. Schwarz
ATTYS.

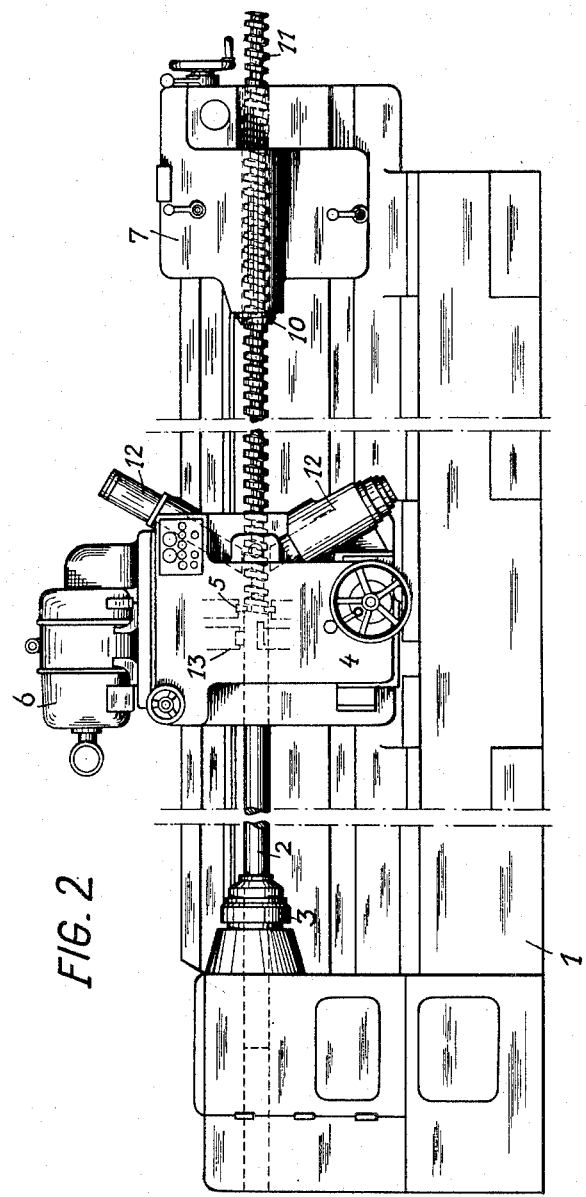

United States Patent Office 2,775,167
Patented Dec. 25, 1956

2,775,167

MACHINING OF LONG WORK-PIECES

Richard Wagner and Johannes Schwarz, Coburg, Germany, assignors to Werkzeugmaschinenfabrik Adolf Waldrich Coburg, Coburg, Germany, a firm Application March 9, 1953, Serial No. 340,962

Claims priority, application Germany September 29, 1952

7 Claims. (Cl. 90—11.4)

This invention relates to a method of machining long work-pieces on machine tools provided with a hollow work spindle, a clamping chuck and a tail-stock or poppet-head. In known machine tools of this kind the length of the workpieces to be machined is limited by the distance between the clamping chuck and the tail-centre in the outermost position of the tail-stock. The range of insertion of such machines is thereby in many cases greatly restricted, particularly when work-pieces of a length exceeding this distance have to be machined.

The object of the present invention is to render the possible range of such machines independent of the length of the work-piece. It proposes a novel method which consists in feeding the work in stages through the work spindle and drawing it forth through the tail-stock, which is equipped with a hollow spindle. The work is therefore first of all clamped in the usual way between the tail-stock and the clamping chuck; and when the portion of the work located between these two members has been machined, the clamping is released, and the work, after the tail centre has been replaced if necessary by an appropriate guiding sleeve, is advanced through the tail-stock, so that now a fresh portion of the work-piece comes in between the clamping chuck and the tail-stock. Of course a guiding sleeve may have been substituted for the tail centre from the outset. The re-chucking operation may be repeated as often as may be required, so that with this method there is no limit to the length of the work-piece that can be machined.

It is particularly advantageous if the work is first seized by a gripping appliance, and then the clamping chuck is released, and the work-piece is advanced through the desired distance by means of the gripping appliance, whereupon the clamping chuck is tightened up again. The angular position of the work-piece is thereby maintained. In certain machining operations, especially in cutting screw threads, it is important that in the re-chucking operation a definite adjustment between the work and the cutting tool should be maintained in the axial direction also. If a screw thread is to be produced extending over a plurality of machining sections, a continuous transition of the thread from one section to another must be ensured. In screw-cutting machines it is known to arrange, in the neighborhood of the operating tool, a supporting device which is connected with the tool slide, and which accompanies all the axial movements of the operating tool. Now the present invention provides for constructing such a supporting device at the same time as a gripping appliance for the work feed. With this construction the relative adjustment of the operating tool in relation to the work is maintained unaltered during the re-chucking operation.

In order that the supporting and gripping appliance may not need to be too massively dimensioned, according to the invention a clamping chuck free from axial forces is employed. It is thereby ensured that upon tightening up the clamping chuck the supporting and gripping appliance will not need to withstand any axial forces, and the work, when being unclamped and re-chucked, cannot be displaced within the gripping appliance.

For carrying out the method on which the invention is based it is advantageous to employ a tail-stock in the hollow spindle of which a tail centre or guiding sleeves of internal diameters adapted to the work to be machined can be optionally inserted.

One constructional example of a screw-cutting machine according to the invention is illustrated in detail in the accompanying drawings, in which:

Figure 1 is a side view of the machine, with a work-piece clamped between the tail-stock and the chuck; and Figure 2 shows the machine of Figure 1 with the work-piece re-chucked.

The machine tool serving for cutting the thread is denoted by 1. This is equipped in the usual manner with a hollow spindle, not further illustrated in the drawings, for feeding the work-piece 2. On the end of this spindle a clamping chuck 3 is mounted. 4 denotes the feed slide or tool slide, on which the operating tool 5, with its driving motor 6, is arranged. At the end of the machine 1 is mounted the tail-stock 7, with its tail centre 8.

A long work-piece 2 is now to be provided with a screw thread on this machine tool, the length of the thread being greater than the distance between the chuck 3 and the tail centre 8 in the outermost position of the tail stock 7. For this purpose the work-piece 2 is first clamped in a known manner between the tail centre 8 and the chuck 3, as shown in Figure 1, the free end 9 of the work piece 2 projecting from the left-hand end of the machine. When the portion of the work 2 that is located between the tail centre 8 and the chuck 3 has been provided with a thread, the tail centre 8 is exchanged for a guiding sleeve 10, the internal diameter of which is selected to accommodate the diameter of the work to be machined. The clamping chuck 3 is then released, and the work-piece is slid into and through the tail-stock 7, so that now a fresh section of the work-piece 2, not yet threaded, comes in between the tail-stock 7 and the chuck 3, and, after the chuck has been tightened up, can likewise be provided with a screw thread, while the finished end 11 of the work-piece 2 protrudes from the tail-stock 7 at the right-hand end of the machine, as shown in Figure 2.

On the tool slide, for the purpose of supporting the work-piece 2, two pairs of supporting arms 12 and 13 are provided, which move along the work-piece during the machining together with the operating tool 5. Now according to the invention these pairs of supporting arms are at the same time constructed as a gripping appliance. When the clamping chuck 3 is released for the purpose of carrying out the re-chucking operation, the work-piece 2 is held fast by this gripping appliance 12, 13, and, when the tool slide 4 is set in motion, is transported forward towards the tail-stock 7. Owing to the fact that the pairs of supporting arms 12 and 13 are at the same time constructed as a gripping appliance, this ensures that the adjustment of the operating tool 5 in relation to the work-piece 2 is maintained, so that the thread to be cut in the work-piece 2 merges imperceptibly from one machining cut to the other.

Support 4 is moved as in a lathe by a guiding spindle surrounded by the spindle lock. The drive of the guiding spindle is effected through a spur reduction gearing and is brought in a certain ratio to the rotary speed of clamping member 3, as is also usual with lathes.

The gripping elements 12 and 13 are shaped like lunettes, e. g., the carrying surfaces of elements 12 are constructed at the lower arm as prism and at the upper arm as a plane. The surfaces of the gripping elements 12 and 13 are so long that several threads are always supported. Lunettes 12 and 13 are actuated by a manually controlled compressed air system (not shown). The clamping member 3 is also set and opened by hand. Since these manipulations are carried out in a required sequence, synchronization of the actuation of the gripping elements 12, 13 and of the clamping member 3 becomes unnecessary.

In order that the gripping appliance 12, 13 may not need to be too massively dimensioned, the chuck 3 is so constructed that it exerts no axial forces in the clamping operation, such as would have to be taken up by the gripping appliance 12, 13.

Since the re-chucking operation can be repeated as often as may be desired, with a machine tool constructed according to the invention there is no limit to the length of the work-pieces that can be machined.

What we claim is:

1. A machine for cutting screw threads in bar stock longer than the machine, comprising a bed, a hollow head stock mounted at one end of said bed including a collet chuck to grip the stock and through which the stock may be fed, a tail stock capable of centering the stock and through which the stock may be fed, a tool carriage mounted on said bed between said head and tail stocks, at least one screw cutting tool mounted in said tool carriage for cutting engagement with the stock, means to drive said carriage lengthwise of said bed, said cutting tool operating to cut threads as the tool carriage moves toward said head stock, and gripping means mounted in said tool carriage operable to clamp said stock in said tool carriage whereby upon clamping said bar stock by said gripping means prior to release of said collet chuck and upon release of said collet chuck the stock may be fed through said head and tail stocks by motion of said tool carriage toward said tail stock while preventing any change in the angular relation between the work-piece and the tool during the feeding of the bar stock through the head and tail stocks.

2. A machine tool for forming working threads on bar stock longer than the machine tool, comprising a hollow spindle, a hollow clamping chuck on said spindle, a hollow tail stock, a tool supporting carriage, a screw cutting tool operatively mounted in said carriage to cut screw threads in the bar stock as said carriage moves toward said spindle, and a stock gripping device mounted on said tool supporting carriage to seize the said bar stock whereby upon gripping of said bar stock by said gripping device and release of said chuck movement of said carriage toward said tail stock will advance said bar stock through said spindle and tail stock without change in the angular relation of bar stock and screw cutting tool.

3. A machine tool for cutting threads on long bar stock, comprising a hollow head stock spindle including a collet chuck, a hollow tail stock, a carriage movable between said head and tail stock, a thread cutting tool supported in said carriage to progressively cut threads in said round stock from the tail stock to the head stock, and stock gripping means on said tool-supporting carriage to seize said bar stock prior to release of said collet chuck and upon release of said collet chuck to advance said round stock through said tail stock during motion of said supporting carriage toward said tail stock, said gripping means being disposed adjacent said operating tool to prevent relative motion between the said screw cutting tool and the said bar stock during said advance.

4. In a machine tool for threading a very long work piece, a head stock including a collet chuck, a tail stock, and a tool support mounted between said head and tail stocks, a cutting tool mounted in said tool support, means for advancing the work piece step by step, each step being at the most the distance between the head and tail stocks, said means comprising a gripping device mounted on said tool support by means of which the work piece may be clamped to said tool support in fixed angular relation with the cutting tool and by which, upon gripping said work piece by said gripping device and subsequent release of said collet chuck, the work piece in the machine may be advanced by displacement of the tool support toward said tail stock.

5. Device according to claim 4, in which the gripping device is arranged adjacent to the cutting tool and is constructed as a bracing device for the work piece when not in use as a gripping device.

6. Device according to claim 4, in which a collet chuck free from axial and tangential forces is used during clamping of the work piece.

7. Device according to claim 4, in which a center or a guide sleeve suited for the work piece to be worked is selectively mounted in the bore of said tail stock.

References Cited in the file of this patent

UNITED STATES PATENTS

| 297,635 | Romans | Apr. 29, 1884 |
|---|---|---|
| 672,872 | Dryer | Apr. 23, 1901 |
| 675,834 | Lake | June 4, 1901 |
| 932,394 | Johnson | Aug. 24, 1909 |
| 2,056,053 | Moore | Sept. 29, 1936 |
| 2,427,322 | Darner | Sept. 9, 1947 |